United States Patent [19]

Smith et al.

[11] Patent Number: 5,522,924

[45] Date of Patent: Jun. 4, 1996

[54] METHOD FOR PRODUCING HIGH BRIGHTNESS LOW ABRASION CALCINED KAOLIN PIGMENT

[75] Inventors: Randolph O. Smith, Milledgeville; William H. Pope, Sandersville, both of Ga.

[73] Assignee: ECC International Inc., Atlanta, Ga.

[21] Appl. No.: 405,610

[22] Filed: Mar. 17, 1995

[51] Int. Cl.$^6$ ................................................. C04B 33/04
[52] U.S. Cl. .................... 106/488; 106/484; 106/486; 501/145; 501/149; 209/10; 209/659; 209/39; 241/23; 241/24.23
[58] Field of Search .................... 106/416, 486, 106/484, 487, 488; 501/141, 145, 149; 523/328.1, 328.2; 209/10, 659, 39; 241/23, 24

[56] References Cited

U.S. PATENT DOCUMENTS

| | | | |
|---|---|---|---|
| 3,450,257 | 6/1969 | Cundy | 209/5 |
| 3,586,523 | 6/1971 | Fanselow et al. | |
| 3,627,678 | 12/1971 | Marston | 210/42 |
| 4,090,688 | 5/1978 | Workman, Jr. | 251/25 |
| 4,381,948 | 3/1983 | MacConnell | 501/145 |
| 4,518,491 | 5/1985 | Bilimoria et al. | 209/166 |
| 4,693,427 | 9/1987 | Bilimoria et al. | 241/23 |
| 5,047,375 | 9/1991 | Dunaway et al. | 501/145 |
| 5,137,574 | 8/1992 | Suitch et al. | 106/439 |
| 5,168,083 | 12/1992 | Matthews et al. | 501/146 |
| 5,227,349 | 7/1993 | Matthews et al. | 501/145 |

*Primary Examiner*—Karl Group
*Assistant Examiner*—Michael Marcheschi
*Attorney, Agent, or Firm*—Klauber & Jackson

[57] ABSTRACT

A process for preparing a high brightness, low abrasion calcined kaolin. A cretaceous crude is wet beneficiated by subjecting same as an aqueous slurry to degritting, classification, magnetic separation, and scrub grinding. The slurry from the foregoing is diluted to less than 15% solids and subjected while well dispersed to a separation in a centrifuge to yield an underflow and an overflow fine fraction having less than 5% solids and a P.S.D. such that at least 85% by weight are of <0.5 μm E.S.D. and at least 30% by weight are of <0.25 μm E.S.D. The overflow fine fraction slurry of dispersed kaolin is subjected to a partial filtration by passing same in cross flow relation to a microporous membrane through which substantially none of the suspended kaolin particles pass, to raise the solids content of the said slurry to at least 20%. This slurry is combined with up to 90% on a dry weight basis of a slurry of a fine particle size tertiary kaolin, and is then bleached, flocculated and filtered to yield a filter cake, which is redispersed, dried and milled to provide a calciner feed. The feed is calcined at temperatures above the kaolin exotherm to yield a calcined product having a brightness of at least 92 and an Einleiner Abrasion less than 24.

8 Claims, 1 Drawing Sheet

METHOD FOR PRODUCING HIGH BRIGHTNESS LOW ABRASION CALCINED KAOLIN PIGMENT

BACKGROUND OF THE INVENTION

This invention relates generally to calcined clay products, and more specifically relates to a calcined kaolin clay pigment and method of manufacture of same. The pigment produced by the method of the invention has a very low abrasion and very high brightness characteristics when used as a filler or a coating in paper products.

In the course of manufacturing paper and similar products, it is well known to incorporate quantities of inorganic materials into the fibrous web in order to improve the quality of the resulting product. The use of appropriate such fillers vastly improves the opacity and printability of certain types of light weight papers such as newsprint. This aspect of use of calcined kaolin clay pigments is discussed in some detail, for example, in Fanselow and Jacobs, U.S. Pat. No. 3,586,523. Other aspects of the presently preferred commercial methods for manufacturing calcined kaolin pigments for use particularly as fillers in paper manufacture, are also set forth in the said Fanselow et al patent, as well as in additional U.S. patents such as McConnell et al, U.S. Pat. No. 4,381,948.

The Fanselow et al and McConnell et al patents are indeed representative of the methodology widely employed in the kaolin industry in order to produce calcined kaolin clay pigments for use in paper manufacturing. Study of these patents will show that the objective of same, as is customary in the art, is to produce a fine particle size calcined kaolin clay pigment of relatively very high brightness, beginning with a crude kaolin which has a relatively very low brightness. A preferred crude feed material for use in processes such as are disclosed in the Fanselow and McConnell patents, is a highly discolored, so-called "gray" kaolin, which is referred to in the Fanselow patent as a "hard sedimentary kaolin clay." Thus, the gray crude which is used in the example of Fanselow has an initial brightness of 78, where the figure cited refers to the so-called G.E. scale. Procedures for measuring brightness as set forth in this application, and as is generally recognized in the industry, are in accord with TAPPI procedure T646os75. As a result of the beneficiation treatment set forth in the Fanselow et al patent, these brightnesses are considerably increased indeed to a very high whiteness. Claim 2 of the Fanselow et al patent thus recites a G.E. brightness within the range of 92% to 95%. Similarly, the McConnell et al patent describes a resultant pigment having a brightness of at least 93 as being the final output product from practice of the beneficiation methods set forth therein. A calcined kaolin pigment substantially produced in accordance with the McConnell et al patent is available commercially from ECC International Inc. of Atlanta, Ga., under the trademark ALPHATEX®.

It may be noted that both the McConnell et al. and the Fanselow et al. patents are concerned with fully calcined kaolins as opposed to metakaolins. When an uncalcined kaolin is heated (i.e. calcined) to about 1098° F. an endothermic reaction occurs. Essentially all of the water of hydration associated with the uncalcined kaolin crystals is eliminated and an essentially amorphous (as measured by X-ray diffraction) material referred to as "metakaolin" results. If the kaolin is heated to higher temperatures, further significant changes occur. The metakaolin undergoes an exothermic reaction (which typically occurs at about 1700° to 1800° F.). Such material (i.e. which has been heated to at least the exotherm) is then referred to as a "fully calcined kaolin".

In the McConnell patent, it is emphasized that the crude used to produce the high brightness pigments preferably includes not more than 2% by weight of titanium expressed as $TiO_2$. A principal reason for this is that clay minerals occurring in nature, including kaolin clays, frequently contain their discoloring contaminants in the form of iron and/or titanium-based impurities. The quantities of the titaniferrous impurities in sedimentary kaolins of Georgia are significant and are commonly present as iron oxide-stained titanium oxides. Irrespective of whether calcining is used, it has commonly been considered in the kaolin industry that it is paramount to refine the crude kaolins to bring the brightness characteristics of the resultant product to a level acceptable for various applications such as paper coating, or as mentioned, even for filling. Among the techniques which have been used in the past to remove the discoloring impurities, are the use of hydrosulfites for converting at least part of the iron-based impurities to soluble form, which may then be extracted from the clay. A further method which has come into increasing use in the kaolin industry involves the use of high intensity magnetic separation as described, for example, in such patents as Marston, U.S. Pat. No. 3,627,678. This method is also useful in removing titaniferrous impurities in that although titania when pure has little magnetic attractability, the iron-stained titania which forms the basis (as mentioned) for the bulk of discolorants in many kaolins, may often be quite effectively removed by imposition of such a high intensity magnetic field.

One of the further, very effective methods for removing titaniferrous impurities including iron oxide-stained titanium oxides, is the froth flotation technique. Generally according to this method, an aqueous suspension or slurry of the clay is formed, the pH of the slurry is raised to an alkaline value and a collector agent is added. The slurry is then conditioned by agitating for a short period. A frothing agent if necessary is added to the conditioned slurry, after which air is passed through the slurry in a froth flotation cell to effect separation of the impurities from the mineral.

Further details regarding the use of froth flotation techniques for removing titanium-based impurities from kaolins may be found at numerous places in the prior art, including for example U.S. Pat. Nos. 3,450,257 to E. K. Cundy, 4,518,491 to B. M. Bilimoria, and U.S. Pat. No. 4,090,688 to Alan Nott. In the procedures set forth in these patents, the iron-stained titania contaminants are separated with the froth.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H. C. Schwalbe (McGraw-Hill Book Company, New York).

One of the long-recognized concerns that arises where a kaolin clay is subjected to calcination is the increase in abrasiveness, which can result from the formation of various abrasive phases during the calcination process. Such abrasiveness is detrimental to the principal use of the pigments, since among other things, it effects rapid wear at portions of the paper making apparatus. The generation of abrasive phases is a particularly acute problem where the higher temperatures incident to full calcination are employed.

While processes such as are described in the McConnell et al and Fanselow et al patents are primarily based on use of feed kaolins which derive from the fine particle-sized tertiary crudes which are commonly referred to as "hard" kaolins, and while these have become the commercially preferable processes for production of high brightness calcined kaolins for use in paper manufacture, it has also long been known to produce calcined kaolins as well from cretaceous deposits of so-called "soft" kaolins. The general steps involved have included subjecting the crude kaolin to a beneficiation program including such steps as classification, bleaching and the like, and recovery of the beneficiated kaolin for use as feed in a calcining process. In general, however, these prior art techniques have not proved satisfactory for producing a calcined kaolin product which is the equal of or superior to the aforementioned products as produced from the tertiary crudes by the processes described in the patents alluded to. One of the explanations for the superiority of the tertiary-based product may be that the tertiary crudes have an extremely fine particle size, which is known to be a factor in reducing abrasiveness in the final calcined product. Heretofore it has not proved feasible to provide an extremely fine feed from a cretaceous crude in commercially acceptable quantities as would enable a commercially viable calcining process. Much less has such a feed been provided which as well was possessed of the other qualities necessary to produce an outstanding product when calcined, such as an acceptably low titania and iron content.

SUMMARY OF INVENTION

Now in accordance with the present invention, it has unexpectedly been found that calcined kaolin pigments of high opacifying properties and low abrasion, may be produced by a process which in one aspect utilizes a heretofore discarded, extremely fine kaolin fraction as a feed for calcination, and which nonetheless produces products which are equal or superior to those produced by the processes of the aforementioned U.S. Pat. Nos. 5,047,375 and 5,137,574. In this aspect of the invention the normally discarded extremely dilute overflow fraction which is separated during the centrifugation steps of the process disclosed in U.S. Pat. No. 5,168,083, is processed to provide the feed for calcination.

Pursuant to the invention a high brightness, a low abrasion calcined kaolin product is prepared from a cretaceous kaolin crude by the steps of:

(a) wet beneficiating the cretaceous crude by subjecting said crude as an aqueous slurry to degritting, classification, magnetic separation, and scrub grinding to produce a first slurry;

(b) diluting the first slurry from step (a) to less than 15% solids and subjecting said slurry while well dispersed to separation in a centrifuge to yield an underflow slurry and an overflow fine fraction slurry having less than 5% solids and a P.S.D. such that at least 85% by weight are of <0.5 μm E.S.D. and at least 30% by weight are of <0.25 μm E.S.D.;

(c) subjecting the overflow fine fraction slurry of dispersed kaolin to a partial filtration by passing said overflow fine fraction slurry in cross-flow relation to a microporous membrane through which substantially no suspended kaolin particles pass, in order to raise the solids content of the said overflow fine fraction slurry to at least 20%;

(d) combining said slurry from step (c) with up to 90% dry weight to dry weight of a second slurry of a kaolin clay having a solids content of at least 20% and in which substantially all kaolin particles in said second slurry have an E.S.D. of less than 1 μm;

(e) bleaching, flocculating and filtering the at least 20% solids combined slurry to yield a filter cake;

(f) redispersing, and drying and milling the filter cake of kaolin to provide a calciner feed; and (g) calcining the feed at temperatures above the kaolin exotherm to yield a calcined product having a brightness of at least 92 and an Einleiner Abrasion of less than 24.0 mg wt loss.

The second slurry is preferably one formed by the process of the U.S. Pat. No. 4,381,948, with the usually tertiary crude clay being wet beneficiated through the particle size separation step that is described in said patent. Before being blended with the first slurry the second slurry may also have been further beneficiated by high intensity magnetic separation. Preferably 10 to 50% of the first slurry will be blended with the second slurry—on a dry weight to dry weight basis.

BRIEF DESCRIPTION OF DRAWING

In the drawing appended hereto:

The FIGURE is a flow diagram illustrating typical process steps conducted in practicing the present invention.

DESCRIPTION OF PREFERRED EMBODIMENT

Figure 1:
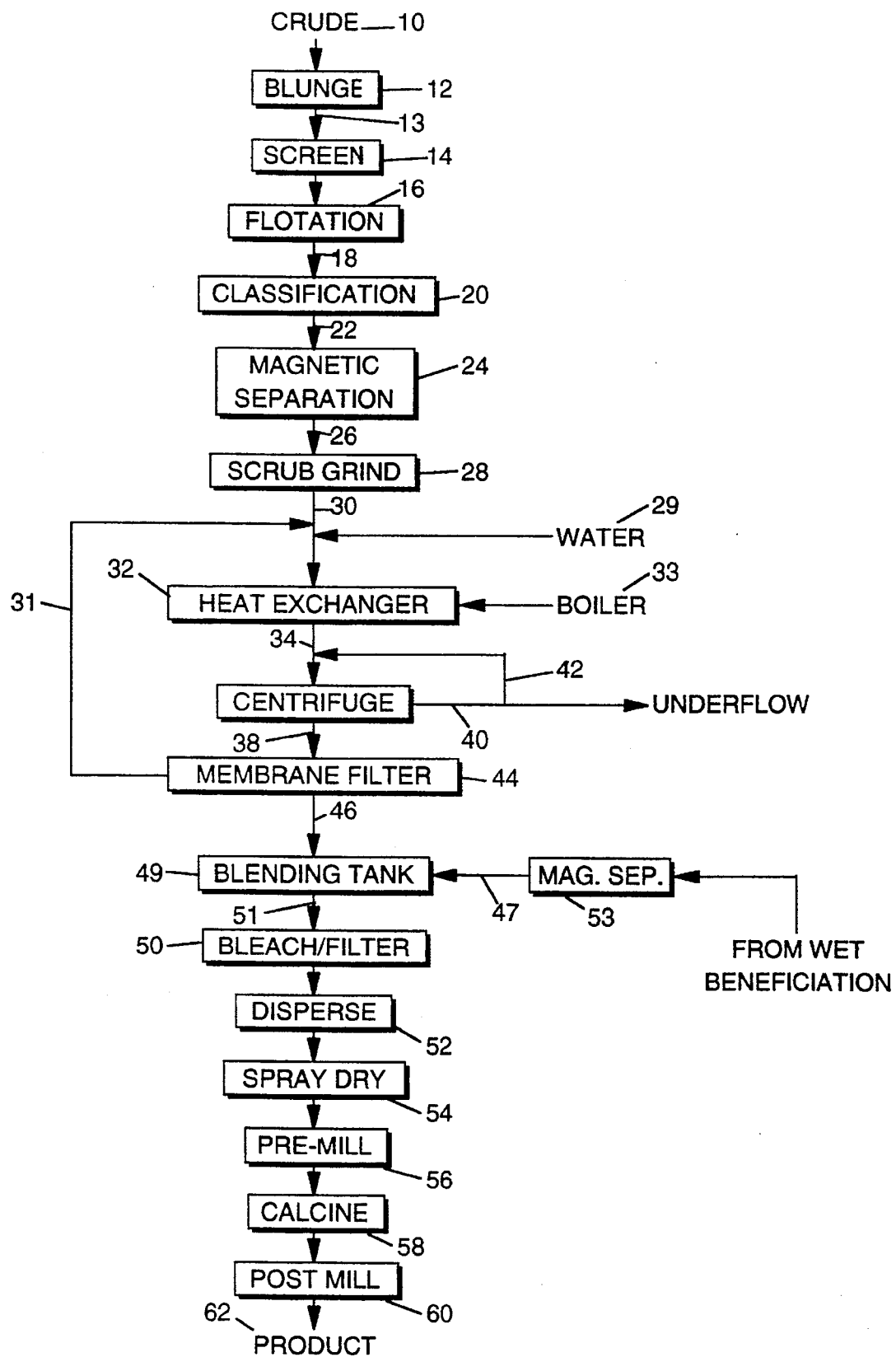

Referring to the FIGURE, the flow diagram schematically illustrates a preferred embodiment of the process of the invention. The starting crude kaolin 10 is a cretaceous crude kaolin which preferably has a $TiO_2$ content by weight in the range of from 1.3 to 2.0%, with 1.3 to 1.6% being preferable; and an iron content of between 0.3 and 0.8% expressed as $Fe_2O_3$. Organic content is typically very low, preferably being less than 0.5%. A typical particle size distribution ("PSD") of this crude kaolin is as follows: 93%<10 μm; 82%<5 μm; 51%<1 μm; 36%<0.5 μm; and 17 %<0.25 μm. In each instance the percentage indicated represents the percent by weight of the crude kaolin which has an equivalent spherical diameter less than the size indicated.

The crude kaolin 10 to be processed is blunged with water, ammonium hydroxide, and a dispersant in a conventional manner in a commercially available blunging apparatus 12 to produce an aqueous slurry 13 of crude kaolin clay having a solids content in the range of from about 20 to 50% by weight solids. Slurry 13 is next degritted, as in conventional practice, to remove substantially all particles in excess of 44 μm (i.e. +325 mesh) equivalent spherical diameter (E.S.D.) Advantageously the degritting of the crude kaolin slurry is carried out by passing the slurry through a screening device 14, such as a sand box. The slurry may then optionally be subjected to a froth flotation process as at 16, utilizing conventional flotation reagents. This serves to remove various titaniferrous impurities as known in the art.

The purified output 18 from the flotation cells is then classified by means of a Bird centrifuge 20 to separate a coarse fraction comprising particles greater than about 5 µm E.S.D. therefrom, which coarse fraction is discarded. As a result of the classification, the output 22 from the Bird centrifuge contains by weight about 92% by weight of less than 2 µm E.S.D. particles. This output is passed to a magnetic separator 24 which may be of the high intensity magnetic separation type previously referenced in Marston, U.S. Pat. No. 3,627,678. The magnetic separation removes additional titaniferous impurities, again as in known in the art, and the output 26 from the magnetic separation step is then subjected to scrub grinding at 28. Specifically the aqueous kaolin suspension exiting from the magnetic separator is passed through a wet media grinder, wherein the aqueous suspension is agitated in the presence of a grinding media, typically +325 mesh sand. The aqueous kaolin clay particles are subjected there to a scrubbing action which is sufficient to break up agglomerates of clay particles into individual particles, but which is insufficient to separate the clay platelets making up the individual particles. This is to say the scrub grinding does not exert enough energy upon the individual particles to delaminate the kaolin particles.

The output slurry 30 from the scrub grinding operation is dispersed to a relatively optimum level of dispersion by which is meant that the Brookfield viscosity of the aqueous slurry is brought to a substantially minimum value. The chemical dispersant mixed into the aqueous kaolin clay suspension most advantageously comprises sodium hexametaphosphate, although other known dispersants may also be employed. The slurry 30 is also diluted with water 29, including with heated water 31 at about 130° to 140° F., and is then passed at a resultant 80° to 120° F. through a heat exchanger 32 which is provided with heated inputs from a boiler 33 at about 150° to 170° F. The slurry passing through the heat exchanger contains about 15% solids. The heated output slurry 34 from the heat exchanger at a temperature of about 110° to 140° F. is then subjected to centrifuging at 36. The heating and use of a relatively optimum dispersion of slurry 34 is desired in order to assure effective defining at centrifuge means 36 of the clay suspension. This aspect of the present invention is discussed in more detail in U.S. Pat. No. 5,168,083, the disclosure of which is incorporated herein by reference. Typically the amount of sodium hexametaphosphate to be added to ensure proper dispersion ranges from 0.5 to 5.0 lbs/ton of dry clay. The amount of water added before the slurry enters the heat exchanger 32 provides an input to centrifuge means 36 such that the solids content of slurry 34 is less than 18% by weight, and preferably is in the range of about 5 to 15% by weight.

In the centrifuge means 36 the aqueous kaolin feed suspension is subjected to centrifugation so as to fractionate the feed suspension into an overflow suspension 38 comprising the finer cut, and which contains a substantial portion of the colloidal material originally contained in the feed suspension. Conversely the underflow suspension 40 comprises the coarser cut and contains a colloidal particle size content substantially lower than the colloidal solids content in the feed suspension 34. In the prior art, as disclosed in said U.S. Pat. No. 5,168,083, the object of the centrifuge operation is to yield as the underflow an aqueous kaolin suspension, which because of the removal of a substantial amount of the finer material therein, in particular the colloidal solids, has a much narrower particle size distribution and consequently exhibits better opacifying ability than the aqueous kaolin feed suspension. In such prior art this is the product sought to be produced—overflow suspension 38 has been considered to be a discardable by-product. In a preferable manner of carrying out the invention, and as is disclosed as one aspect of the aforementioned U.S. Pat. No. 5,168,083, two stages of centrifuging may be used as centrifuge means 36. This is preferably achieved by utilizing a disc-nozzle type centrifuge equipped for internal recycle. Recycle disc-nozzle type centrifuges are commercially available from Dorr Oliver Incorporated of Stamford, Conn. and Alfa-Laval, Inc. of Fort Lee, N.J.

Where two stages are thus used, the initial kaolin suspension is fed into the first stage of the centrifuge and fractionated therein into an overflow suspension comprising a low solids slurry of finer kaolin particles and an underflow suspension comprising a higher solids slurry containing a substantially lower content of colloidal solids than the feed suspension. The underflow slurry is collected and its solids content reduced by the addition of dilution water to a level less than about 18% solids and preferably in the range of 5 to 15% solids by weight prior to passing the diluted underflow slurry into the second centrifuge stage. In the second centrifuge stage, the diluted underflow slurry from the first centrifuge means is subjected to a further fractionation into an overflow suspension and a product underflow suspension. In the showing of the appended FIGURE, it is illustratively assumed that the centrifuge means used comprises the aforementioned internal recycle disc-nozzle type arrangement. Here it is seen that the underflow 40 is provided to an internal recycle path 42 enabling repassage through the centrifuge means.

Normally the underflow, as in the U.S. Pat. No. 5,168,803, is taken as product representing a highly defined (i.e. fines-removed) material. The overflow indicated at 38 is normally considered to be a product to be discarded as it has in the past. Pursuant to the invention, however, the overflow product at a very high state of dilution, typically being 4 to 5% solids, and consisting of high colloidal content materials, is further processed pursuant to the invention to provide a feed for use in calcining. Heretofore, such a highly dilute slurry has proved impractical for commercially utilizable filtration, which may in part explain why the said overflow material has heretofore been considered as material to be discarded. In accordance with the present invention, however, the very dilute 4 to 5% solids slurry is subjected to a membrane filtration in apparatus of the type disclosed in commonly assigned U.S. Pat. No. 5,227,349. As thus disclosed therein a dispersed slurry of extremely fine kaolin, for example, one in which at least 90% by weight of the particles, are of less than 2 µm (and including high percentages of sub-½ and sub-¼ µm particles) may be filtered with virtually 100% effectiveness, in the sense that substantially no kaolin particles pass as permeate, by flowing the slurry generally parallel to and in contact with the surface of a microporous barrier while maintaining a pressure drop across the barrier in a direction transverse to the slurry flow. A gel permeation layer of kaolin is thereby formed overlying the surface of the microporous barrier, such layer and the underlying surface being substantially impervious to the passage of clay solids therethrough while being pervious to the passage of water molecules, ions and dissolved salts. Accordingly, the water molecules, ions and dissolved salts are caused to pass through the barrier, thereby increasing the concentration of the solids in the kaolin slurry. The microporous barrier may be formed from polymeric membranes, and can also be formed from sintered metals or the like as described in the aforementioned patent, the entire disclosure of which is hereby incorporated by reference.

The very dilute slurry 38 provided to the membrane filter 44 typically has a size distribution such that at least 85% by weight of the particles of same are of less than 0.5 μm E.S.D., and at least 30% by weight are of less than 0.25 μm E.S.D. The output slurry 46 from the membrane filter 44 is recovered at about 20 to 55% solids with 26% solids being typical. The permeate 31 is usefully recycled at about 130° to 140° F., as a source of dilution and preheating for the slurry to heat exchanger 32.

Slurry 46 is then blended with up to 90% on a dry weight to dry weight basis of a second slurry 47 in a blending tank 49 to form a combined slurry 51. The second slurry 47 is preferably one which has been formed by the process of the aforementioned U.S. Pat. No. 4,381,948, whereby the crude (usually tertiary-derived) kaolin has been wet beneficiated through a centrifugal particle size separation so that substantially all particles in the slurry are less than 1 μm E.S.D. The solids content of the second slurry is at least 20% and is generally between 25 and 30%. As shown in the FIGURE the said slurry 47 may be subjected to a high intensity magnetic separation at 53 before being merged with the first slurry at tank 49.

The typically 26% solids slurry 46 is then subjected to conventional bleaching and filtering operations at 50. Specifically, the slurry is flocced with sulfuric acid, then reductive bleached, then filtered in a conventional filter, as for example a rotary vacuum filter, and washed. The resulting filter cake, typically at 50 to 60% solids is redispersed at 52 with the aid of a dispersing agent, and is then subjected to spray drying 54, as for example in a spray tower. The resulting dried material is premilled at 56 and then calcined at 58. Calcination is carried out at temperatures above the kaolin exotherm, and can range as high as about 2050° F. However, the final feed from the premilling operation is sufficiently free of any discolorants as a result of the extensive beneficiation program aforementioned that effective calcining can usually be conducted at temperatures no higher than about 1950° F., and if no tertiary kaolin is blended, calcination at a temperature range of 1700° to 1800° F. is usually effective. The calciner feed, as a result of the said process, is highly beneficiated and is unusually fine, whereby the resulting calcined product 62, following a final postmilling at 60 has a brightness of at least 92 and an Einleiner abrasion less than 24 mg wt loss.

Einleiner Abrasion is determined by a procedure similar to that described in U.S. Pat. No. 5,011,534. The Sample to be tested is prepared, however, at 10% solids, and screen wear evaluated after 174,000 revolutions. The Einleiner Abrasion is reported in mg weight loss per 174,000 revolutions.

The invention is further illustrated by the following Examples which are to be deemed exemplary only of the present invention.

EXAMPLE 1

The process illustrated in the FIGURE was utilized in the processing of a crude cretaceous kaolin having the following initial characteristics:

| ESD (μm) | % Finer Than |
|---|---|
| 10.00 | 92.5 |
| 7.00 | 87.3 |
| 5.00 | 81.6 |
| 3.00 | 71.6 |
| 2.00 | 63.6 |
| 1.00 | 51.2 |
| 0.75 | 45.2 |

-continued

| ESD (μm) | % Finer Than |
|---|---|
| 0.50 | 35.6 |
| 0.35 | 25.7 |
| 0.25 | 16.9 |

The said crude cretaceous clay was blunged for 15 minutes using 10 lbs/ton of oleic acid; 0.3 lbs/ton of ammonium polyacrylate dispersant; 2.2 lbs/ton of sodium silicate; and 2 lbs/ton of sodium metasilicate, with the pH being adjusted to about 9.5 with sodium hydroxide. After being screened to the aforementioned +325 mesh, the slurry at a solids content of 26% was floated for 1.5 hours using conventional flotation agents and 8.8 lbs/ton of sodium silicate. Classification in the Bird centrifuge was conducted to a level of 98% less than 2 μm. The slurry at 25.6% solids was then subjected to a high intensity magnetic separation using a field intensity of 20 kilogauss and a fine steel wool matrix and a retention time of 2.0 minutes. Using an Alfa-Laval centrifuge of the type aforementioned, a 4 to 5% solids slurry was formed from the magnetic separator output, provided to the membrane filter, and (without blending with a tertiary kaolin) a 26% solids slurry recovered as output. The latter was subjected to the conventional operations of flocculation, reductive bleaching, and filtering on a rotary filter, with the filter cake being redispersed and spray dried. Premilling was conducted in a Bauer mill, with the product then being subject to calcination in a vertical calciner at a temperature of about 1900° F. The product from the calcining was then further milled in a series of horizontal mills as discussed in U.S. Pat. No. 4,693,427. The properties of the calciner feed (i.e. from the premilling at 56) are shown in Table I where comparison is made to a tertiary clay-derived calciner feed prepared as in U.S. Pat. No. 4,381,948:

TABLE I

| Property | Calciner Feed Product of Invention | Control Calciner Feed produced as in U.S. Pat. No. 4,381,948 |
|---|---|---|
| Brightness | 88.2 | 81.4 |
| $TiO_2$ | 2.24 | 1.418 |
| $Fe_2O_3$ | 0.38 | 0.859 |
| PSD | | |
| –2 μm | 98.7 | 98.0 |
| –1 μm | 97.8 | 95.9 |
| –0.5 μm | 89.4 | 85.0 |
| –0.25 μm | 52.7 | 51.9 |

Comparison of the aforementioned properties shows in Table I a considerable difference in the respective calciner feeds with respect to brightness. The calciner feed of the present invention is seen, however, to be very similar to the control feed, except that unlike the control feed, it is derived from a cretaceous kaolin.

EXAMPLE 2

For purposes of further comparison, the final calcined products yielded by practice of the present invention in Example 1, were compared with the calcined product yielded in the practice of the process substantially corresponding to that disclosed in said U.S. Pat. No. 4,381,948 aforementioned. The calciner feed of the invention was as in Table I. In the control process, as also discussed, the feed material is derived from an extremely fine tertiary kaolin which is subjected to wet beneficiation treatment as discussed in said U.S. patent.

The resulting physical properties are compared in Table II below:

TABLE II

Physical Properties of Calcined Products

| Property | Calcined Product of Invention | Control Calcined Product produced as in U.S. Pat. No. 4,381,948 |
|---|---|---|
| TiO$_2$ | 0.09 | 1.04 |
| Brightness | 92.5 | 92.5 |
| Calcination Temperature (°F.) | 1900 | 2000 |
| Einleiner Abrasion | 24 | 24 |
| Normalized Scatter (10% loading) | 650 | 650 |
| Porosity (cm$^3$/g) | 1.10 | 1.14 |

Although lower calcining temperatures are used, the product of the invention is seen to have properties which are at least as good, if not superior to those of the control. Of particular interest is that by virtue of the lower calcination temperatures that can be used (while still achieving high brightness) the abrasion can in many instances be markedly reduced.

EXAMPLE 3

A series of further calciner feed samples similar to the feed product of the invention in Table I, were calcined as in Example 2, but at calcination temperatures in the range of 1700° to 1800° F. The brightness target of at least 92 was achieved for all samples. Einleiner abrasions for all samples were below 10, being more specifically measured in the range of 7 to 9.

EXAMPLE 4

A plant trial was run utilizing a vertical calciner to calcine at 1950° F. blends of 75% of prior art feed products with 25% of the feed product of the invention. Two control calciner feeds similar to that in Table I were calcined to produce control samples 1 and 2. The beneficiated slurries used to produce the control samples, i.e. corresponding to slurry 47 in the FIGURE, were blended (as at tank 49) with the slurry 46 containing the cretaceous fines, and the blends were then processed and calcined as shown in the FIGURE. Two such composite samples from this test were evaluated in handsheets to compare their performance with use of the prior art product alone. Physical properties are given in Table III. It will be evident that the product of the invention has very similar characteristics to the calcined tertiary clay product of the prior art, as shown by the absence of change in measured characteristics that occur with the addition of the product of the invention.

TABLE III

Physical Properties of Calcined Samples

| | Control Sample 1 | Control Sample 2 | Blend 1 75% Control Sample 1 and 25% Product of Invention | Blend 2 75% Control Sample 2 and 25% Product of Invention |
|---|---|---|---|---|
| Brightness | 92.2 | 92.8 | 92.7 | 93.1 |
| Residue 325 | 0.0076 | 0.004 | 0.0041 | 0.0048 |
| Moisture | 0.8 | 0.6 | * | * |
| pH | 6.7 | 5.4 | 5.9 | 6.9 |
| TiO$_2$ | 1.04 | 1.48 | * | * |
| Fe$_2$O$_3$ | 0.569 | 0.82 | * | * |
| Surface Area | 23.8 | 18.3 | * | * |
| L | 97.43 | 97.42 | * | * |
| a | 0 | −0.62 | * | * |
| b | 2.19 | 2.07 | * | * |
| PSD | | | | |
| <10 μm | 99 | 99 | 99 | 98.7 |
| <2 μm | 91 | 92 | 89.5 | 89 |
| <1 μm | 85 | 86 | 82.8 | 82 |
| <.5 μm | 58 | 57 | 53.6 | 51 |
| <.25 μm | 11 | 12 | 9.3 | 9 |

EXAMPLE 5

The four samples the properties of which appear in Table III, were evaluated as fillers in handsheets. Several filler levels were evaluated, and the interpolated values of the sheet characteristics for 10% loading are given in Table IV. The addition of the product of the invention is again seen to have little or no significant effect on the sheet properties, again showing that the product of the invention is substantially equal in performance to the prior art product produced by calcination of a fine particle size tertiary crude.

TABLE IV

Sheet Properties at 10% Filler Level

| Filler | % Sheet Brightness | Sheet Scatter[1] Cm$^2$/g | Printing Opacity[2] | Burst Factor |
|---|---|---|---|---|
| Unfilled | 83.3 | 298 | 69.5 | 36.9 |
| Control Sample 1 | 87.8 | 683 | 83.8 | 21.0 |
| Control Sample 2 | 88.1 | 676 | 83.6 | 20.2 |
| Blend 1 | 87.9 | 665 | 83.4 | 20.9 |
| Blend 2 | 88.0 | 664 | 83.5 | 20.0 |

[1,2]See U.S. Pat. No. 5,047,375

EXAMPLE 6

A feed (Control Sample 4) similar to that used for Control Sample 1 was blended with 10%, 30% and 50% of the feed of the invention (Table I), and the blends calcined as in Example 2. The resultant calcined products (including a calcined further control Sample 3, similar to Control Sample 4) were then evaluated as fillers in handsheets as in Example 5. Sheet properties are shown in Table V. Sheet brightness increases as the level of addition of the feed product of the invention increases. (The calcined blends per se also showed increased pigment brightness, respectively being 93.3, 93.6 and 94.1 for the 10%, 30% and 50% blends respectively.) Light scatter did not change significantly as the level of addition of the feed product of the invention increased to 50%. Opacity does start to somewhat decrease because of the higher pigment brightness giving lower absorption coefficients.

TABLE V

Sheet Properties 10% Filler

| Material Calcined | Brightness | Scatter | Opacity |
|---|---|---|---|
| Control Sample 3 | 87.2 | 670 | 84.1 |
| Control Sample 4 | 88.0 | 691 | 84.7 |
| Product of Invention | 87.8 | 686 | 84.5 |
| 10% Feed Product of Invention 90% Control Sample 4 | 88.1 | 694 | 84.6 |
| 30% Feed Product of Invention 70% Control Sample 4 | 88.2 | 691 | 84.3 |
| 50% Feed Product of Invention 50% Control Sample 4 | 88.4 | 682 | 84.1 |

While the present invention has been set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. A process for preparing a high brightness, low abrasion calcined kaolin, comprising:
   (a) wet beneficiating a cretaceous crude by subjecting said crude as an aqueous slurry to degritting, classification, magnetic separation, and scrub grinding to produce a first slurry;
   (b) diluting the first slurry from step (a) to less than 15% solids and subjecting said slurry while well dispersed to separation in a centrifuge to yield an underflow slurry and an overflow fine fraction slurry having less than 5% solids and a P.S.D. such that at least 85% by weight are of <0.5 µm E.S.D. and at least 30% by weight are of <0.25 µm E.S.D.;
   (c) subjecting said overflow fine fraction slurry of dispersed kaolin to a partial filtration by passing said overflow fine fraction slurry in cross flow relation to a microporous membrane through which substantially no suspended kaolin particles pass in order, to raise the solids content of said overflow fine fraction slurry to at least 20%;
   (d) combining said slurry from step (c) with up to 90% dry weight to dry weight of a second slurry of a kaolin clay having a solids content of at least 20% and in which substantially all kaolin particles in said second slurry have an E.S.D. of less than 1 µm;
   (e) bleaching, flocculating and filtering said at least 20% solids slurry to yield a filter cake;
   (f) redispersing, and drying and milling the filter cake of kaolin to provide a calciner feed; and
   (g) calcining the feed at temperatures above the kaolin exotherm to yield a calcined product having a brightness of at least 92 and an Einleiner Abrasion less than 24.0.

2. A process in accordance with claim 1, wherein the slurry in step (c) has its solids content raised into the range of 20 to 55%.

3. A process in accordance with claim 1, wherein the kaolin in said second slurry is of tertiary origin.

4. A process in accordance with claim 3, wherein said second slurry has a 25 to 30% solids content.

5. A process in accordance with claim 2, wherein from 10 to 50% by dry weight kaolin of the slurry from step (c) is combined in step (d) with the said second slurry.

6. A process in accordance with claim 2, in which the diluted slurry in step (b) is heated to from 110° to 140° F. before being fed to said centrifuge; and wherein hot water separated in step (c) at said microporous membrane is recycled to the diluting of the slurry in step (b) to enable use of the hot water in heating of the slurry.

7. In the process for preparing a high opacity kaolin product from a cretaceous kaolin crude by the steps of:
   (a) wet beneficiating the cretaceous crude by subjecting said crude as an aqueous slurry to degritting, classification, magnetic separation, and scrub grinding to produce a first slurry; and
   (b) diluting the first slurry from step (a) to less than 15% solids and subjecting said slurry while well dispersed to separation in a centrifuge to yield an underflow slurry and a normally discarded overflow fine fraction slurry having less than 5% solids and a P.S.D. such that at least 85% by weight are of <0.5 µm E.S.D. and at least 30% by weight are of <0.25 µm E.S.D.;

THE IMPROVEMENT enabling utilization of said normally discarded fine fraction to produce a high brightness, low abrasion calcined kaolin, comprising:
   (1) subjecting said overflow fine fraction slurry of dispersed kaolin to a partial filtration by passing said overflow fine fraction slurry in cross flow relation to a microporous membrane through which substantially no suspended kaolin particles pass in order, to raise the solids content of said overflow fine fraction slurry to at least 20%;
   (2) bleaching, flocculating and filtering said at least 20% solids slurry to yield a filter cake;
   (3) redispersing, and drying and milling the filter cake of kaolin to provide a calciner feed; and
   (4) calcining the feed at temperatures above the kaolin exotherm to yield a calcined product having a brightness of at least 92 and an Einleiner Abrasion less than 24.

8. The process of claim 7, wherein prior to step (2), the slurry, is combined with up to 90% dry weight to dry weight of a second slurry of a tertiary kaolin having a solids content of at least 20% and in which substantially all kaolin particles in said second slurry have an E.S.D. of less than 1 µm.

* * * * *